United States Patent [19]

Crandall

[11] 3,796,902

[45] Mar. 12, 1974

[54] ELECTRON STORAGE DEVICE WITH LONG STORAGE TIME CAPABILITY

[75] Inventor: Walter E. Crandall, Malibu, Calif.

[73] Assignee: Northrop Corporation, Los Angeles, Calif.

[22] Filed: Dec. 15, 1971

[21] Appl. No.: 208,252

[52] U.S. Cl. .............................. 313/68 R, 313/329
[51] Int. Cl. ......................... H01j 31/08, H01j 29/08
[58] Field of Search ............................ 313/68 R, 73

[56] References Cited

UNITED STATES PATENTS

| | | | |
|---|---|---|---|
| 2,149,977 | 3/1939 | Morton | 313/73 X |
| 2,645,734 | 7/1953 | Rajchman | 313/73 X |
| 2,696,571 | 12/1954 | Law | 313/73 |
| 2,337,578 | 12/1943 | Teal | 313/68 R X |
| 2,481,458 | 9/1949 | Wertz | 313/68 R |
| 2,747,131 | 5/1956 | Sheldon | 313/68 R X |
| 2,922,906 | 1/1960 | Day et al. | 313/68 R X |
| 3,020,433 | 2/1962 | Day | 313/68 R |
| 3,441,768 | 4/1969 | Pugh et al. | 313/68 R |

*Primary Examiner*—Robert Segal
*Attorney, Agent, or Firm*—Sokolski, McCormack & Schaap

[57] ABSTRACT

A storage tube target for use in a read and write storage tube system. A conductive plate member or shield contains openings into which conductive rods are inserted. Insulating dielectric material is used to space the rods from the shield. The conductive rods separated from the conductive shield by the dielectric material form individual capacitances making it possible to achieve exceptionally long storage times for the storage elements in this target. Moreover, the rods provide conductive connection between the write and read ends of the target.

4 Claims, 2 Drawing Figures

PATENTED MAR 12 1974 3,796,902

ELECTRON STORAGE DEVICE WITH LONG STORAGE TIME CAPABILITY

This invention relates in general to storage tube systems, and more particularly to a target for use in a storage tube system having a long storage time.

BACKGROUND OF THE INVENTION

In storage tube systems which incorporate both a read and write capability, it is desirable in certain applications to store the data "written" into the system as long as possible. Thus, if the data is not to be "read" immediately, it can be stored until needed. In these read/write data storage systems, the signal representing data to be stored is fed into an input cathode ray gun and the electron beam of the gun generates a potential on a storage device, thus "writing" the data on the storage device. To "read" the stored data, an output cathode ray gun and control circuitry are energized. The electron beam from the gun impinges on the storage device, and the electrons emitted from the storage device provide an output signal indicative of the stored data.

If the "written" data is not "read" in sufficient time or if the stored "written" data is repetitively "read," the stored data will be gradually discharged. Thus, it is necessary to design the storage device such that the storage time can be increased sufficiently so that the data can be accurately read within the desired amount of time.

In order to overcome the attendant disadvantage of prior art targets for use in cathode ray tube read/write systems, the present invention provides a target having a significant increase in storage time capability over prior art storage devices. The present invention increases the capacitance of the individual resolution elements without an equivalent decrease in resistance of the element, which results in an increase of the target storage time. Such targets can be used in memory tubes and display devices where long storage times are required.

SUMMARY OF THE INVENTION

The invention provides a storage tube system target having long storage times. The target comprises a conductive plate member or shield having dielectrically isolated conductive rods therein interconnecting the write and read ends of the target. The rods are spaced from the shield by insulating material. The rod and shield structure interconnects the write and read end of the target and provides a capacitive storage element having long storage times.

The advantages of this invention, both as to its construction and mode of operation will be readily appreciated as the same becomes better understood by reference to the following detailed description when considered in connection with the accompanying drawings, in which like referenced numerals designate like parts throughout the figures.

DESCRIPTION OF THE PREFERRED EMBODIMENT

Figure 1:
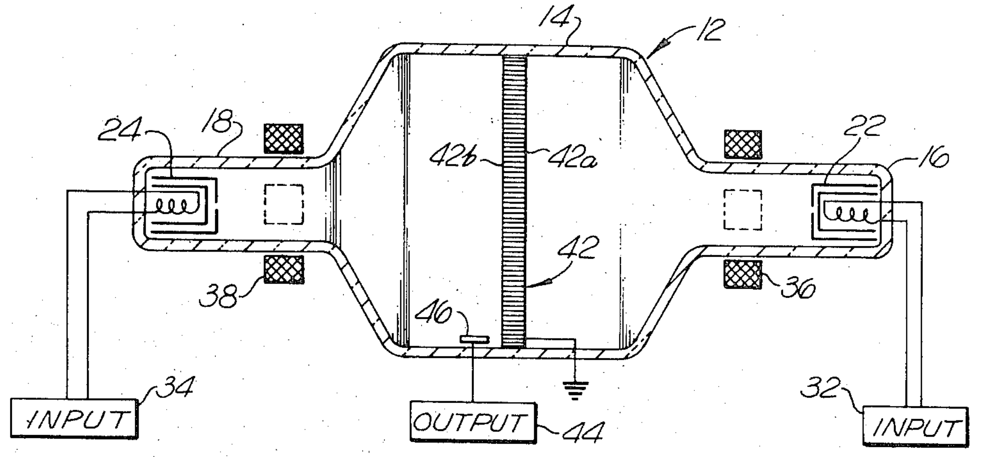
FIG. 1 depicts a conventional read/write data storage system.

Referring now to the drawings, there is shown in FIG. 1 a storage tube system employing an improved target of the invention. An envelope 12 contains an enlarged central portion 14 and a pair of reduced opposite ends 16 and 18. Housed in each of the ends 16 and 18 are conventional cathode ray tubes 22 and 24, respectively. Each of the cathode ray tubes has input terminals 32, 34 and magnetic deflection coils 36 and 38, respectively, associated therewith. Centrally mounted within the enlarged portion 14 of the envelope 12 is a target assembly 42. Further, a signal output terminal 44 is provided.

In normal operation, "write" picture signals representing data to be stored are coupled to the input terminal 32 of the cathode ray tube 22. The electron beam of the tube 22 strikes a write surface **42*a* of the target assembly 42** and the data is stored in the target assembly.

To "read" the stored data, the electron gun and the associated circuitry of the cathode ray tube 24 are energized. The reading beam of electrons impinges upon a read surface **42*b* of the target assembly. The portion of the target assembly which has information stored thereon will tend to emit secondary electrons in accordance with the stored charge, and these electrons are collected at a collector 46**, providing an output signal indicative of information stored on the addressed portion of the target.

Figure 2:
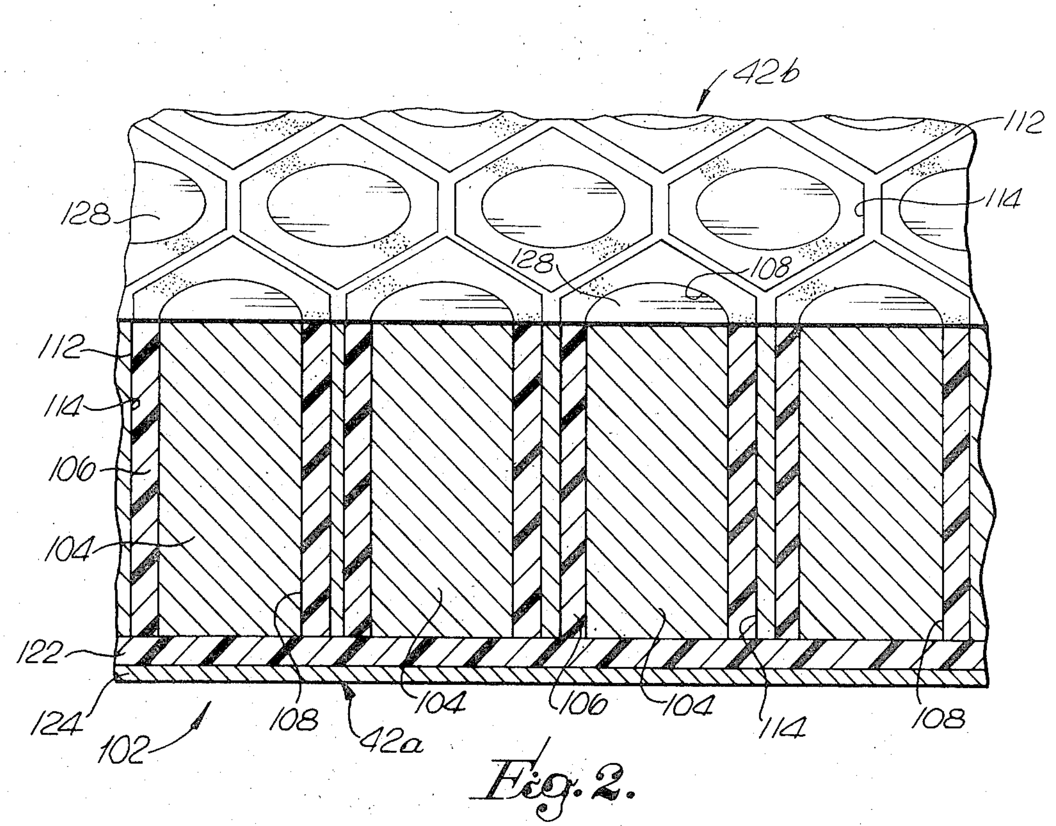
FIG. 2 illustrates a perspective view of a target, partly in section, made in accordance with the invention which can be used in the system of FIG. 1.

Referring now to FIG. 2, there is shown a target assembly 42, made in accordance with the principles of the invention, which can be used in the storage tube system of FIG. 1. The target comprises a plurality of conductive cylindrical rods 104, which form target resolution elements. Surrounding each of the rods is a dielectric insulating material member 106 of hexagonal outer cross-section which contains an inner opening 108 into which the conductive rods 104 are inserted. The members 106 are normally made of a high resistive glass.

A conductive plate member or shield 112 having a thickness equal to the length of the rods 104 and the members 106 contains a plurality of openings 114 into which the insulating members 106 are inserted. As can be readily seen, a capacitance is formed between the rods 104 and the shield 112 with the dielectric member 106 therebetween, fully insulating the rods from the shield. Typically, the rods 104 and the shield 112 may be made of Kovar, which has approximately the same coefficient of expansion as glass members 106. Alternately, either the rods 104 or the shield 112 may be made of tungsten or similar type metals.

At one end of the shield there is deposited a layer of a material such as zinc sulfide 122. Then an aluminum backplate 124 is deposited on the zinc sulfide layer. Typically, the layers 122 and 124 may be deposited by conventional evaporative techniques. These layers form the "write" end **42*a*** of the target.

The "read" end **42*b* of the target is formed by the surfaces 128 of the conductive rods. Since the rods 104** are of a relatively large cross-sectional area, it is unnecessary to secure end plates thereto in forming the "read" surface.

In operation of the target of FIG. 2, the conductive shield 112 as well as the aluminum backplate 124 are normally grounded. The target is then "flooded" by means of read tube 24 to provide a predetermined uniform potential on all of the conductive rods 104 to thus "clear" the target for "writing." Then the "write" gun is used to scan the target elements. The energetic electrons penetrate through the backplate and into the normally insulating layer of zinc sulfide. These electrons cause the insulator to conduct proportionally to the magnitude of the "writing" beam at the instant it is scanning each target element. The variable charge conducted to the individual storage elements constitutes the stored written data on the conductive rods 104. Thus a change in the charge pattern on the conductive rods which have been addressed by the "write" beam results. The magnitude of the charge that can be effectively stored on the rods is increased by virtue of the capacitance between such rods and the shield 112 separated therefrom by dielectric members 106.

To read the target, the read beam scans the read side thereof. If the read strikes the target at a point where no charge transfer has occurred, the secondary emission ratio is equal to one, and the current signal at the collector 46 will be approximately equal to the read beam intensity.

If, however, the read beam strikes an area of the target which has been charged, the collector signal will be larger than the read beam intensity since the secondary emission ratio will be greater than one indicating information has been written in this area.

The conductive shield 112 is normally grounded during operation of the target. Further, since the conductive rods 104 extend through the target, coupling of the signal from one side of the target to the other side is accomplished by conduction.

The capacity of each resolution element with respect to ground depends upon the thickness of the target assembly, the radius of each of the rods 104, and the thickness of the dielectric layer 106. By adjusting these dimensions, as can be readily seen, high capacities necessary for long storage times can be provided.

Further, the thickness of the target can be made as large as a few inches and as small as a few tenths of a millimeter. With a large thickness, a very rugged and solid structure can be obtained, and thus large area targets are possible.

Moreover, it should be understood that the layer of zinc sulfide could be replaced with similar type materials, such as cadmium sulfide, with equally satisfactory results. Also, while the rods 104 have been shown as cylindrical and insulating members 106 have been depicted as being hexagonal in cross-section, it should be understood that either configuration could be used for either part. By so varying these cross-sectional areas the resultant desired high capacitance, as well as conductive areas, can be adjusted to obtain the desired target structure.

I claim:

1. A read-write storage tube system comprising:
- an envelope having an enlarged central portion and a pair of reduced opposite end portions,
- a cathode ray tube unit mounted in each of said reduced end portions,
- a conductive plate member mounted in the enlarged central portion of the envelope and having a pair of oppositely oriented surfaces, each of said surfaces facing one of said cathode ray tube units, there being a plurality of openings formed in said plate member and extending between said oppositely oriented surfaces,
- a conductive cylindrical rod mounted in each of said openings,
- dielectric material radially surrounding said rods placed between said rods and the walls of said openings, said dielectric material having a hexagonal perimeter and spacing said rods from the opening walls,
- a layer of dielectric material covering one of the surfaces of said plate member, the ends of the dielectric material between said rods and opening walls being adjacent to said layer of dielectric material, and
- a layer of conductive material placed over said dielectric layer,
- whereby a storage capacitor is formed by each of said rods and said plate member and charge is transferred to said capacitors from the dielectric layer covering the plate member surface.

2. The storage tube target of claim 1 wherein the rods and the plate member are of materials having substantially the same coefficient of expansion.

3. A storage tube in accordance with claim 1 wherein said dielectric material is formed of zinc sulfide.

4. A storage tube in accordance with claim 1 wherein said dielectric material is formed of cadmium sulfide.

* * * * *